(12) United States Patent
Jeong et al.

(10) Patent No.: US 7,916,577 B2
(45) Date of Patent: Mar. 29, 2011

(54) METHOD AND SYSTEM FOR RECOGNIZING LOCATION BY USING SOUND SOURCES WITH DIFFERENT FREQUENCIES

(75) Inventors: Hyuk Jeong, Daejeon (KR); Jong-Sung Kim, Daejeon (KR); Wook-Ho Son, Daejeon (KR); Hong-Kee Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 272 days.

(21) Appl. No.: 12/234,300

(22) Filed: Sep. 19, 2008

(65) Prior Publication Data
US 2009/0154294 A1   Jun. 18, 2009

(30) Foreign Application Priority Data
Dec. 17, 2007   (KR) .................. 10-2007-0132592

(51) Int. Cl.
*G01S 3/80* (2006.01)
(52) U.S. Cl. ........................................ 367/128
(58) Field of Classification Search .................. 367/127, 367/128
See application file for complete search history.

(56) References Cited

U.S. PATENT DOCUMENTS

| 4,471,473 A * | 9/1984 | Ziese ............................. 367/103 |
| 5,214,615 A | 5/1993 | Bauer |
| 6,141,293 A * | 10/2000 | Amorai-Moriya et al. ... 367/127 |
| 2007/0070812 A1* | 3/2007 | Lee ............................... 367/128 |
| 2009/0154294 A1* | 6/2009 | Jeong et al. .................... 367/128 |

FOREIGN PATENT DOCUMENTS

| JP | 08-114666 | 7/1996 |
| JP | 2001-337157 | 7/2001 |
| KR | 1020050082247 | 8/2005 |
| KR | 1020050089184 | 9/2005 |
| KR | 1020060043442 | 5/2006 |

OTHER PUBLICATIONS

Korean Notice of Allowance for Korean Patent Application No. 10-2007-0132592.

* cited by examiner

*Primary Examiner* — Dan Pihulic
(74) *Attorney, Agent, or Firm* — Lowe Hauptman Ham & Berner LLP

(57) ABSTRACT

Provided is a method for recognizing a location to control the location of a moving object, the method including: generating a synchronizing signal for a plurality of ultrasonic satellites; the plurality of the ultrasonic satellites simultaneously transmitting ultrasonic signals respectively comprising different frequencies from each other, the plurality of the ultrasonic satellites fixed on predetermined static positions; a receiver, attached to the moving object, receiving the ultrasonic signal and measuring distances between the receiver of the moving object and each of the plurality of the ultrasonic satellites by classifying the frequencies of the ultrasonic signals; and calculating a current location of the moving object by using the measured distances.

8 Claims, 3 Drawing Sheets

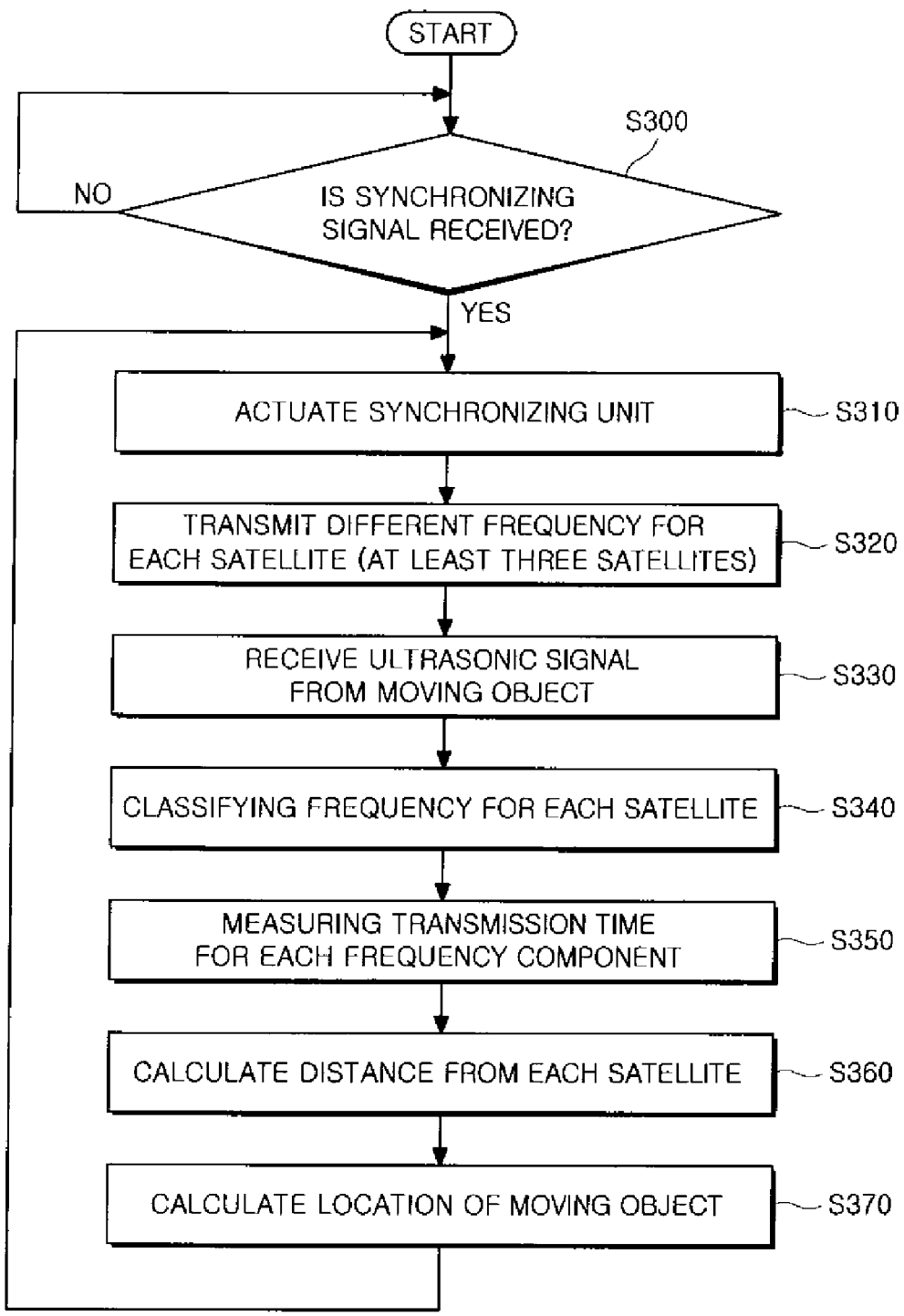

METHOD AND SYSTEM FOR RECOGNIZING LOCATION BY USING SOUND SOURCES WITH DIFFERENT FREQUENCIES

CROSS-REFERENCE TO RELATED APPLICATIONS

This application claims priority under 35 U.S.C. §119 to Korean Patent Application No. P2007-132592, filed on Dec. 17, 2007, the disclosure of which is incorporated herein by reference in its entirety.

BACKGROUND OF THE INVENTION

1. Field of the Invention

The present disclosure relates to a method and a system for recognizing a location by using an ultrasonic signal, more particularly, to a method and a system for recognizing a location which are capable of calculating a coordinate of a moving object by using a plurality of ultrasonic satellites generating ultrasonic signals simultaneously.

This work was supported by the IT R&D program of MIC/IITA [Work Management Number: 2007-S-108-01, The Development of u-Experience content operating platform based on mixed reality]

2. Description of the Related Art

In recent years, a Global Positioning System (GPS) is widely used as one of the systems for recognizing a location, and is provided in a wide area by using an outdoor artificial satellite. However, the location recognizing system using such a GPS cannot be used in an indoor environment, and may not be inoperable in an area crowded with buildings. Furthermore, the location recognizing system using such a GPS has good relative accuracy in a very wide area, but has a repeatable accuracy as low as several meters in a small area.

Korean Patent No. 0351962 entitled "Navigation System Using Pseudolites" discloses a method that can be also used indoors by complementing typical systems for recognizing a location. However, such a system has a difficulty in being practically used because signal strength thereof is greatly changed in a close range.

Therefore, various techniques have been proposed to apply ultrasonic signals to the system for recognizing a location in easier way than the above systems.

FIG. 1 is a schematic view illustrating the Bat ultrasonic location system proposed as an active Bat system by AT&T Laboratories Cambridge. The system has the characteristic of transmitting ultrasonic signals from a moving object. The method for recognizing a location by using the ultrasonic signals is a method for calculating an arrival time of an ultrasonic signals transmitted from the moving object at a number of receivers because the moving object has a difficulty in transmitting a number of ultrasonic signals simultaneously due to interference property of the ultrasonic signals differently from a method using a radio wave. However, there is a disadvantage in that such a method is applicable to only a single moving object.

U.S. Pat. No. 5,793,704 entitled "Method and Device for Ultrasonic Ranging" discloses method for calculating a distance by using the maximum amplitude of an ultrasonic signal, but this method has a complex configuration and a limitation in its performance.

Korean Patent Publication No. 10-2003-0093387 entitled "Ultrasonic Sensor System for Position and Direction Estimation of Mobile Object" discloses a method for allowing a moving object to receive ultrasonic signals. However, a number of moving objects cannot be independently operated in this system because synchronizing signals are transmitted from the moving object. This system requires another regulation due to interference between ultrasonic signals transmitted from a number of moving objects.

Korean Patent Application No. 10-2005-0018538 entitled "Positioning System Using Ultrasonic and Control Method of the System" employs a method for measuring a distance from each of transmitters by fixing ultrasonic transmitters and sequentially transmitting ultrasonic signals. However, a measurement of a location of a moving object may be delayed according to the number of ultrasonic satellites necessary for recognizing transmission interval and transmission location of ultrasonic signals because all ultrasonic transmitters must transmit ultrasonic signals by once in order to calculate a location of a receiver.

SUMMARY

Therefore, an object of the present invention is to provide a method and a system for recognizing a location which can simultaneously transmit and receive components with different frequency without sequential transmissions of the ultrasonic signals.

Another object of the present invention is to provide a method and a system for recognizing a location which can perform a three-dimensional positioning by disposing at least three transmitters on the same plane instead of disposing four or more transmitters of the related art.

To achieve these and other advantages and in accordance with the purpose(s) of the present invention as embodied and broadly described herein, a method for recognizing a location to control the location of a moving object by installing an ultrasonic satellite transmitting an ultrasonic signal in accordance with an aspect of the present invention includes: generating a synchronizing signal at a plurality of the ultrasonic satellites; simultaneously transmitting, at the ultrasonic satellites, the ultrasonic signals respectively comprising different frequency from each other; measuring, at a receiver of the moving object receiving the ultrasonic signal, a distance between the receiver of the moving object and each ultrasonic satellite by classifying a frequency of the ultrasonic signal; and calculating a current location of the moving object by using the measured distance.

To achieve these and other advantages and in accordance with the purpose(s) of the present invention, a location determination receiver for recognizing a location of a moving object in accordance with another aspect of the present invention includes: an ultrasonic antenna; a receiving unit capable of simultaneously processing three or more ultrasonic signals; a operation unit for calculating a distance from each of ultrasonic satellites transmitting each of the ultrasonic signals by using a reception of each of the ultrasonic signals; and a location determining unit for calculating a current location of the receiver by using the distance from each of ultrasonic satellites.

To achieve these and other advantages and in accordance with the purpose(s) of the present invention, a system for recognizing a location of a moving object in accordance with another aspect of the present invention includes: a plurality of ultrasonic transmitters for transmitting an ultrasonic signal comprising different frequency respectively; a reference signal broadcasting device for supplying a synchronizing signal to each of the ultrasonic transmitters; a ultrasonic receiver for determining its own three-dimensional location by receiving the ultrasonic signals from the ultrasonic transmitters; a server for providing location coordinates of the plurality of the ultrasonic transmitters; and a controller for controlling the ultrasonic transmitters to transmit the ultrasonic signals simultaneously.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3 is a flowchart illustrating a procedure of a method for recognizing a location according to an embodiment of the present invention.

DETAILED DESCRIPTION OF EMBODIMENTS

Hereinafter, a preferable embodiment according to the present invention will be described in detail with reference to the accompanying drawings.

Figure 1:
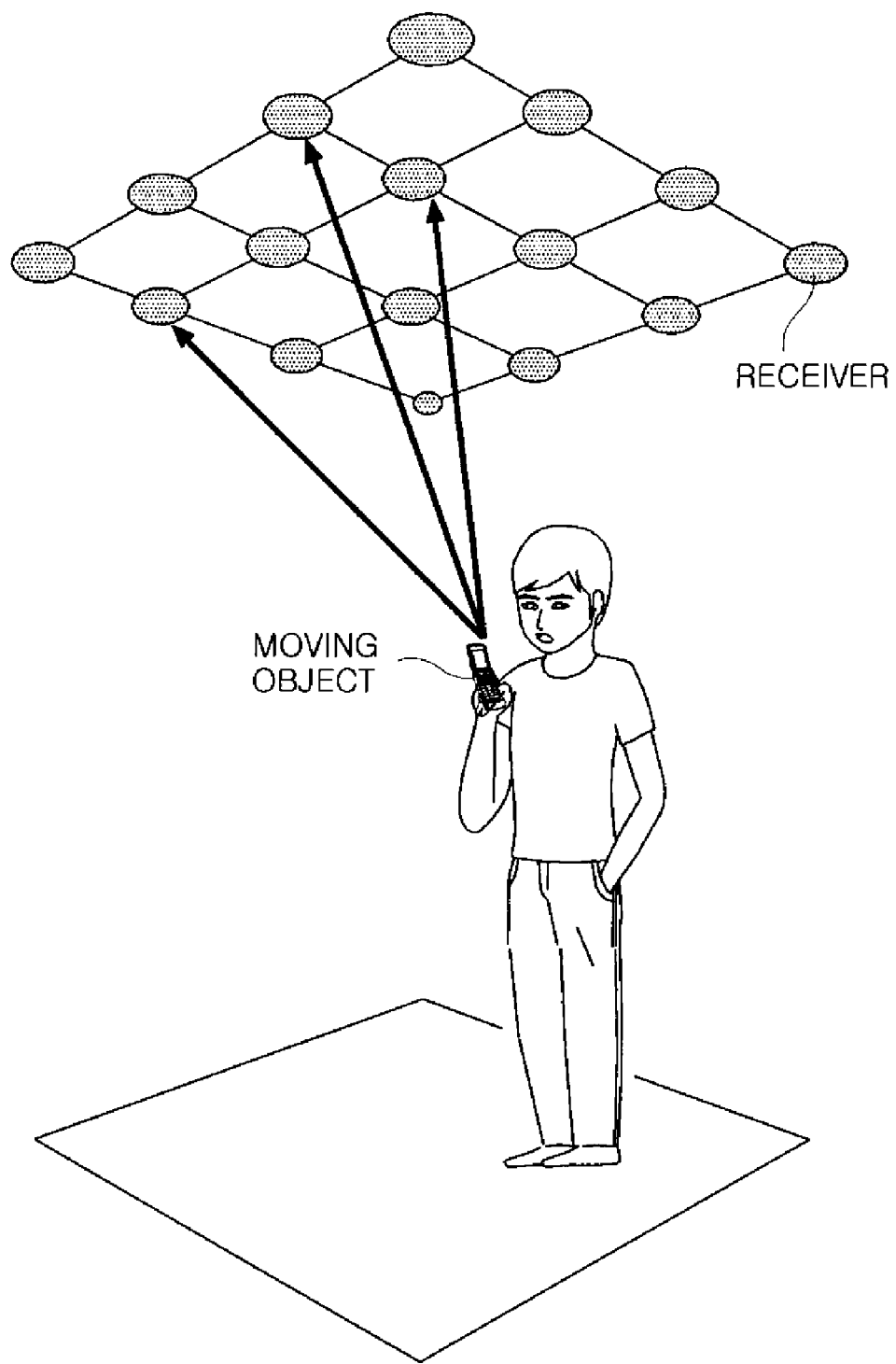
FIG. 1 is a schematic view illustrating an example of typical systems for recognizing a location using a ultrasonic signals.
Figure 2:
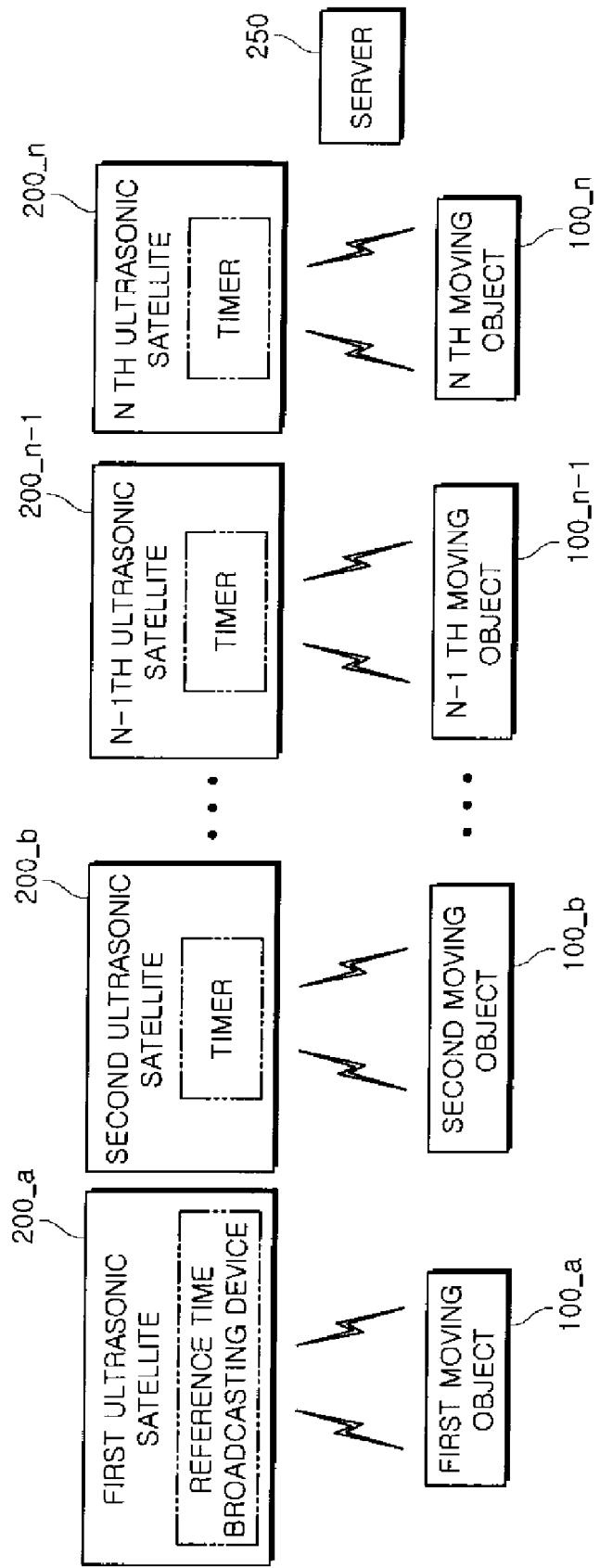
FIG. 2 is a block diagram illustrating a system for recognizing a location using an ultrasonic signal according to an embodiment of the present invention.

FIG. 2 is a block diagram illustrating a system for recognizing a location using an ultrasonic signal according to an embodiment of the present invention.

Referring to FIG. 2, the system includes a reference time broadcasting device, a plurality of ultrasonic satellites 200_a to 200_n transmitting ultrasonic signals, a plurality of location determination receivers 100_a to 100_n detached to moving objects, a server for providing a coordinate of each ultrasonic satellite, and a wire/wireless network for connecting the server, the moving objects and the ultrasonic satellites.

Each of the ultrasonic satellites has a unique serial number, and includes an ultrasonic transmitter for transmitting an ultrasonic signal having different frequency from each other, which simultaneously transmits the ultrasonic signal in accordance with synchronizing signals.

The reference time broadcasting device generating the synchronizing signals may be any one of the ultrasonic satellites under operation, or a external separate device such as a GPS satellite or a commercial broadcasting satellite including visual information. In addition, a location determination receiver mounted into a mobile phone of a user may transmit the synchronizing signals.

Each ultrasonic satellite may transmit the ultrasonic signal at a time immediately after reception of the synchronizing signals or at a time after a lapse of a predetermined time from the reception of the synchronizing signals. It is important for all the ultrasonic satellites to transmit the ultrasonic signals simultaneously. However, each ultrasonic satellite transmits the ultrasonic signals preferably at a time immediately after the reception of the synchronizing signals or at a time very close to the reception of the synchronizing signals for a simple and exact location calculation because locations of the moving objects being the target of a location calculation may vary with time.

Meanwhile, when a timer is mounted into each ultrasonic satellite, each ultrasonic satellite may be configured to independently transmit the ultrasonic signals simultaneously at a certain interval.

As described above, each of the ultrasonic satellites transmit the ultrasonic signals having different frequencies from each other. Therefore, a system and a method for recognizing location according to the embodiment of the present invention solve the problem of frequency interference, thereby enabling simultaneous recognition of a plurality of moving objects located at a certain space.

FIG. 3 is a flowchart illustrating a procedure of a method for recognizing a location according to an embodiment of the present invention. Hereinafter, a method for recognizing a location in the above system will be fully described.

Referring to FIG. 3, a plurality of ultrasonic satellites 200_a to 200_n are respectively assigned a unique serial number, and transmits its own unique serial number or an ultrasonic frequency and a location coordinate to a location determination receiver 100. The unique serial number and the location coordinate may be transmitted by a server 250 or each of ultrasonic satellites 200_a to 200_n. The transmission to the location determination receiver 100 may be performed in various ways such as a wire/wireless data link or the like before the location determination receiver 100 enters a certain area.

In operation S300, ultrasonic satellites 200_a to 200_n determine whether a synchronizing signal is received. In operation S310, a synchronizing unit is actuated when the synchronizing signal is received. Next, in operation S320, each of ultrasonic satellites 200_a to 200_n transmits a predetermined ultrasonic signal having different frequency from each other.

The number of the ultrasonic satellites 200_a to 200_n is at least four when the ultrasonic satellites 200_a to 200_n are disposed on the same plane, or is at least three when the ultrasonic satellites 200_a to 200_n disposed on different planes.

When the location determination receiver 100 of the moving object receives an ultrasonic signal in operation S330, the location determination receiver 100 analyzes the frequencies of the ultrasonic signals in operation S340 and calculates transmission times of frequency components in operation S350.

The location determination receiver 100 emits a synchronizing signal, or receives the synchronizing signal together with the ultrasonic satellites 200_a to 200_n. The synchronizing signal has the velocity of light as a sort of radio wave. Therefore, the transmission time can be obtained by calculating difference between a time when the location determination receiver 100 transmits or receives the synchronizing signal and a time when the location determination receiver 100 receives the ultrasonic signals having different frequencies.

Each transmission time means a time interval from a time when the synchronizing signal is transmitted to a time when the ultrasonic signal is transmitted to the moving object. If the transmission time is obtained, the location determination receiver 100 can calculate distances from ultrasonic satellites 200_a to 200_n by means of the following equation in operation S350

DISTANCE=VELOCITY OF SOUND*TRANSMISSION TIME.

Meanwhile, since the location determination receiver 100 knows location information of the ultrasonic satellites 200_a to 200_n, current location of the location determination receiver 100 can be obtained from the following equation 1 by using distances from the ultrasonic satellites 200_a to 200_n In a system for recognizing a location by using an ultrasonic according to a preferable embodiment of the present invention, the ultrasonic satellites 200_a to 200_n simultaneously transmit the ultrasonic signals having different frequencies from each other because interference may occur due to superposition of the ultrasonic signals simultaneously transmitted from the ultrasonic satellites 200_a to 200_n. Subsequently, distance values from ultrasonic satellites 200_a to 200_n having a unique serial number in accordance with ultrasonic components of ultrasonic satellites 200_a to 200_n are calculated from an envelope for each frequency obtained by classifying components for each frequency.

Reference information on the velocity of sound corrected according to a current medium (e.g., air) and conditions (e.g., temperature, humidity, etc.) by measuring distances between the ultrasonic satellites 200_a to 200_n is provided to the moving objects, so that the location determination receiver 100 can calculate the distances between the location determination receiver 100 and each of the ultrasonic satellites 200_a to 200_n more exactly.

Since the location determination receiver 100 detached to the moving object receives the ultrasonic signals having different frequencies simultaneously or immediately, the location determination receiver 100 with a single receiving end requires to recognize frequencies received from the ultrasonic satellites 200_a to 200_n by separating each frequency component of the received ultrasonic signal. A method for separating the frequency components may employ a band pass filter generally used for classifying frequency components, or Fourier transform and inverse Fourier transform.

According to another embodiment of the present invention, a location determination receiver 100 may be configured to receive signals having different frequencies simultaneously transmitted from ultrasonic satellites 200_a to 200_n by including a plurality of receiving ends each of which can receive only a specific frequency.

Hereinafter, a method for calculating a location of a moving object will be fully described.

In a typical method, distances di (where i=1, 2, 3 and 4) from four fixed positions (xi, yi, zi) (where i=1, 2, 3 and 4) is necessary to gain a location of a point (x, y, z) in the three dimensional orthogonal coordinate. Given distances from the four fixed positions, the location of the point can be obtained from the following equations (1):

$$(x-x_1)^2+(y-y_1)^2+(z-z_1)^2=d_1^2,$$

$$(x-x_2)^2+(y-y_2)^2+(z-z_2)^2=d_2^2,$$

$$(x-x_3)^2+(y-y_3)^2+(z-z_3)^2=d_3^2,$$

$$(x-x_4)^2+(y-y_4)^2+(z-z_4)^2=d_4^2. \quad (1)$$

The following equations (2) can be derived from the equations (1) by eliminating the second order terms:

$$(x_1-x_2)x+(y_1-y_2)y+(z_1-z_2)z=\alpha,$$

$$(x_2-x_3)x+(y_2-y_3)y+(z_2-z_3)z=\beta,$$

$$(x_3-x_4)x+(y_3-y_4)y+(z_3-z_4)z=\gamma, \quad (2)$$

If changed into a determinant, the equations (2) can be expressed as the following equation (3):

$$A \begin{bmatrix} x \\ y \\ z \end{bmatrix} = \begin{bmatrix} \alpha \\ \beta \\ \gamma \end{bmatrix} \quad (3)$$

where each term can be expressed as the following equation (4):

$$A = \begin{bmatrix} (x_1-x_2)(y_1-y_2)(z_1-z_2) \\ (x_2-x_3)(y_2-y_3)(z_2-z_3) \\ (x_3-x_4)(y_3-y_4)(z_3-z_4) \end{bmatrix},$$

$$\alpha = \frac{1}{2}\{(x_1^2-x_2^2+y_1^2-y_2^2+z_1^2-z_2^2)-(d_1^2-d_2^2)\}$$

$$\beta = \frac{1}{2}\{(x_2^2-x_3^2+y_2^2-y_3^2+z_2^2-z_3^2)-(d_2^2-d_3^2)\}$$

$$\gamma = \frac{1}{2}\{(x_3^2-x_4^2+y_3^2-y_4^2+z_3^2-z_4^2)-(d_3^2-d_4^2)\}$$

where a matrix A of the determinant Det (A) must not be 0 to have an inverse matrix.

Most of ultrasonic satellites installed indoors are located on the ceiling. Accordingly, given that a vertical axis extending from the bottom to the ceiling is z-axis, an inverse matrix can not be obtained because a value of the Det (A) becomes 0 due to z1=z2=z3=z4. That is, the matrix A can not have an inverse matrix, no matter how many ultrasonic satellites are located on a single plane of the ceiling or the bottom.

Therefore, a method for recognizing a location of a moving object when a plurality of transmitters are located on a single plane such as a ceiling will be described according to an embodiment of the present invention.

Given that a vertical axis extending from the bottom to the ceiling is z-axis, z1=z2=z3=z4 in the equation (1). Subsequently, the following equation (5) can be obtained from the equation (4) by eliminating the third terms in the equation (2):

$$A = \begin{bmatrix} (x_1-x_2)(y_1-y_2) \\ (x_2-x_3)(y_2-y_3) \end{bmatrix}, \quad (5)$$

$$\alpha = \frac{1}{2}\{(x_1^2-x_2^2+y_1^2-y_2^2)-(d_1^2-d_2^2)\}$$

$$\beta = \frac{1}{2}\{(x_2^2-x_3^2+y_2^2-y_3^2)-(d_2^2-d_3^2)\}.$$

A coordinate (x, y) of the moving object can be obtained from the equation (5).

If the moving object locates at lower height than the height of the ceiling, and z means the height, z of the moving object can be obtained from the following equation (6):

$$z=z_1-\sqrt{d_1^2-(x-x_1)^2-(y-y_1)^2} \quad (6)$$

When the ultrasonic satellites are located on the same plane as the ceiling, three dimensional coordinate of the moving object can be obtained from only three ultrasonic satellites As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for recognizing a location to control the location of a moving object, the method comprising:
generating a synchronizing signal for a plurality of ultrasonic satellites;
the plurality of the ultrasonic satellites simultaneously transmitting ultrasonic signals respectively comprising different frequencies from each other, the plurality of the ultrasonic satellites fixed on predetermined static positions;
a receiver, attached to the moving object, receiving the ultrasonic signal and measuring distances between the receiver of the moving object and each of the plurality of the ultrasonic satellites by classifying the frequencies of the ultrasonic signals; and
calculating a current location of the moving object by using the measured distances.

2. The method of claim 1, further comprising:
endowing each of the plurality of the ultrasonic satellites with a unique serial number:
transmitting, at each of the plurality of the ultrasonic satellites, the unique serial number, location information and a frequency used in each of the ultrasonic satellites, to the moving object; and
storing/managing the unique serial number, the location information and the frequency in the receiver of the moving object.

3. The method of claim 1, wherein the measuring of the distance comprises:
receiving the ultrasonic signal comprising different frequency transmitted from the ultrasonic satellite immediately or at a predetermined time after a reception of the synchronizing signal;
obtaining a time interval between a simultaneous time or a predetermined lapsed time after the reception of the synchronizing signal and a time of the reception of the ultrasonic signal; and
calculating the distance from each of the ultrasonic satellites by multiplying the time interval by the velocity of sound.

4. The method of claim 1, wherein the measuring of the distance comprises:
comprising information on a time when the ultrasonic signal is transmitted from each of the ultrasonic satellites in the transmitted ultrasonic signal;
obtaining a time interval between a time recorded in the information comprised in the received ultrasonic signal and a time when the receiver receives the ultrasonic signal actually; and
calculating the distance from each of the ultrasonic satellites by multiplying the time interval by the velocity of sound.

5. A location determination receiver for recognizing a location of a moving object, comprising:
an ultrasonic antenna;
a receiving unit capable of simultaneously processing three or more ultrasonic signals;
an operation unit for calculating a distance from each of ultrasonic satellites fixed on predetermined static positions for transmitting each of the ultrasonic signals by using a reception of each of the ultrasonic signals; and
a location determining unit for calculating a current location of the receiver by using the distance from each of ultrasonic satellites,
wherein the receiver is attached to the moving object to recognize the location of the moving object.

6. The location determination receiver of claim 5, further comprising a timer.

7. A system for recognizing a location of a moving object, comprising:
a plurality of ultrasonic transmitters for transmitting an ultrasonic signal comprising a different frequency respectively, the plurality of ultrasonic transmitters fixed on predetermined static positions;
a reference signal broadcasting device for supplying a synchronizing signal to each of the ultrasonic transmitters;
a ultrasonic receiver for determining its own three-dimensional location by receiving the ultrasonic signals from the ultrasonic transmitters, the ultrasonic receiver attached to the moving object; and
a server for providing location coordinates of the plurality of the ultrasonic transmitters,
wherein the ultrasonic transmitters simultaneously transmit the ultrasonic signals in accordance with the control of a controller.

8. The system of claim 7, wherein the number of the ultrasonic transmitters are three or more when the ultrasonic transmitters are coplanarly disposed within a space in which the moving object is able to move, and are four or more when the ultrasonic transmitters are non-coplanarly disposed.

* * * * *